(12) United States Patent
Bennett et al.

(10) Patent No.: US 11,941,073 B2
(45) Date of Patent: Mar. 26, 2024

(54) GENERATING AND IMPLEMENTING KEYWORD CLUSTERS

(71) Applicant: 97th Floor, Lehi, UT (US)

(72) Inventors: Christopher Douglas Bennett, Ladera Ranch, CA (US); Paxton Michael Gray, Lehi, UT (US); Wayne Gregory Sleight, Lehi, UT (US); Patrick Ralph Bennett, Huntington Beach, CA (US)

(73) Assignee: 97th Floor, Lehi, UT (US)

( * ) Notice: Subject to any disclaimer, the term of this patent is extended or adjusted under 35 U.S.C. 154(b) by 610 days.

(21) Appl. No.: 16/725,730

(22) Filed: Dec. 23, 2019

(65) Prior Publication Data
US 2021/0191995 A1 Jun. 24, 2021

(51) Int. Cl.
G06F 16/00 (2019.01)
G06F 16/906 (2019.01)
G06F 16/953 (2019.01)
G06F 16/958 (2019.01)

(52) U.S. Cl.
CPC ......... *G06F 16/953* (2019.01); *G06F 16/906* (2019.01); *G06F 16/986* (2019.01)

(58) Field of Classification Search
CPC ..... G06F 16/953; G06F 16/906; G06F 16/986
USPC ....................................................... 707/711
See application file for complete search history.

(56) References Cited

U.S. PATENT DOCUMENTS

| | | | |
|---|---|---|---|
| 8,180,760 B1 * | 5/2012 | Carver | G06F 16/355 707/708 |
| 8,515,937 B1 * | 8/2013 | Sun | G06Q 30/02 709/240 |
| 8,527,352 B2 * | 9/2013 | Chatwin | G06Q 30/0277 705/14.69 |

(Continued)

FOREIGN PATENT DOCUMENTS

| | | |
|---|---|---|
| CN | 106649362 | 5/2017 |
| CN | 106709052 | 5/2017 |

(Continued)

OTHER PUBLICATIONS

Kumar, M et al., Keyword Query Based Focused Web Crawler, 6th International Conference on Smart Computing and Communications, ICSCC Jul. 8, 2017-Dec. 2017, Kurukshetra, India; pp. 585-590.

*Primary Examiner* — Jean M Corrielus
(74) *Attorney, Agent, or Firm* — Ray Quinney & Nebeker P.C.; Paul N. Taylor

(57) ABSTRACT

The present disclosure relates generally to systems, methods, and computer-readable media for selectively identifying candidate keywords for a target domain, generating keyword clusters based on the candidate keywords, and implementing the candidate keywords within published online content. In particular, systems disclosed herein generate or otherwise obtain access to a collection of keywords and value metrics descriptive of a profile of the keywords with respect to a target domain. The systems can selectively identify candidate keywords having unique value to a (Continued)

domain and generate keyword clusters including the keywords and associated terms. The systems described herein can further implement the keyword clusters within a structure of published content items that are linked or otherwise associated with the target domain.

20 Claims, 7 Drawing Sheets

(56) References Cited

U.S. PATENT DOCUMENTS

| | | | | |
|---|---|---|---|---|
| 8,793,238 | B1* | 7/2014 | Carver | G06F 16/355 |
| | | | | 707/708 |
| 9,798,820 | B1* | 10/2017 | Prémont-Schwarz | |
| | | | | G06F 16/3347 |
| 10,740,359 | B1* | 8/2020 | Browne | G06F 16/9535 |
| 11,775,573 | B2* | 10/2023 | Pevtsov | G06F 16/90335 |
| | | | | 706/12 |
| 2004/0024748 | A1* | 2/2004 | Brown | G06F 16/906 |
| | | | | 707/E17.069 |
| 2004/0034660 | A1* | 2/2004 | Chen | G06F 16/313 |
| | | | | 707/E17.084 |
| 2005/0106539 | A1* | 5/2005 | Bagley | G06F 16/313 |
| | | | | 707/E17.084 |
| 2007/0288514 | A1* | 12/2007 | Reitter | G06F 16/951 |
| 2008/0103892 | A1* | 5/2008 | Chatwin | G06Q 30/08 |
| | | | | 705/14.54 |
| 2008/0243783 | A1* | 10/2008 | Santi | G06F 16/487 |
| 2010/0281011 | A1* | 11/2010 | Santi | G06F 16/9535 |
| | | | | 707/706 |
| 2011/0119267 | A1* | 5/2011 | Forman | G06Q 10/00 |
| | | | | 707/750 |
| 2012/0078719 | A1 | 3/2012 | Bhagwan et al. | |
| 2013/0124492 | A1 | 5/2013 | Gao et al. | |
| 2014/0089286 | A1* | 3/2014 | Delli Santi | G06F 16/9538 |
| | | | | 707/706 |
| 2016/0125087 | A1* | 5/2016 | Mallah | G06F 16/285 |
| | | | | 705/14.54 |
| 2018/0039643 | A1* | 2/2018 | Tober | G06F 16/9535 |
| 2018/0096067 | A1* | 4/2018 | Tober | G06Q 30/0203 |
| 2018/0307680 | A1 | 10/2018 | Wu et al. | |
| 2019/0043095 | A1* | 2/2019 | Grimaud | G06Q 30/0242 |
| 2019/0384802 | A1* | 12/2019 | Chung | G06F 40/143 |
| 2020/0142930 | A1* | 5/2020 | Wang | G06F 18/23213 |

FOREIGN PATENT DOCUMENTS

| | | | | |
|---|---|---|---|---|
| CN | 110889020 | A | * 3/2020 | ........... G06F 16/906 |
| CN | 114547421 | A | * 5/2022 | |
| CN | 115080824 | A | * 9/2022 | |
| KR | 101048540 | | 7/2011 | |
| TW | I567574 | | 1/2017 | |
| WO | WO2006003896 | | 1/2006 | |
| WO | WO-2018000557 | A1 | * 1/2018 | ........... G06F 16/313 |

* cited by examiner

GENERATING AND IMPLEMENTING KEYWORD CLUSTERS

BACKGROUND

Recent years have seen significant grown in the engagement of online users. Indeed, it is now common for search engines, social networking systems, and other web platforms to provide tools that enable users of various platforms to search and/or navigate content shared via a particular website or on multiple websites. Many search engines, social networking systems, and other web platforms implement tools and models for providing search query results that link to websites having online content thereon. Conventional tools and models, however, suffer from a variety of problems and drawbacks.

For example, conventional search engines often fail to provide an effective way in which individuals or entities can facilitate surfacing of results that might be relevant to a particular webpage. Indeed, many large businesses may monopolize common search terms to such an extent that directing web traffic to a webpage via a particular search engine is near impossible for most businesses or individuals even where a search query is directly related to products or services associated with the website. Moreover, while many search engines provide a mechanism that enables individuals, businesses and other entities to purchase search result space, this can become expensive and may result in paying for search results to be presented to a non-relevant or non-interested audience.

In addition, conventional tools for optimizing search results or bidding for specific terms and words is often overly broad or poorly targeted. For example, many conventional systems and methods may simply attempt to boost a domain or websites profile for terms having a high predicted conversion rate. However, while these terms may be valuable to businesses or websites that show up at the top of a list of search results, these terms may simply be too crowded to enable a new entity to boost a domain's profile enough to be relevant to a particular search term. As a result, many individuals, businesses, and other entities may pay significant money to promote a domain profile in connection with specific search terms with disappointing results.

Furthermore, many conventional techniques involve a marketer manually coming up with a set of keywords to promote based on a quick review of terms that are predicted to be relevant and useful for a particular entity. Manually identifying keywords to promote, however, is inefficient and often results in poor results. Moreover, manually identifying keywords and carrying out promotion of those keywords can be time consuming and expensive.

These and other problems exist in connection with identifying keywords to target for a particular website or domain and implementing the keywords in an effective way.

DETAILED DESCRIPTION

Figure 1:
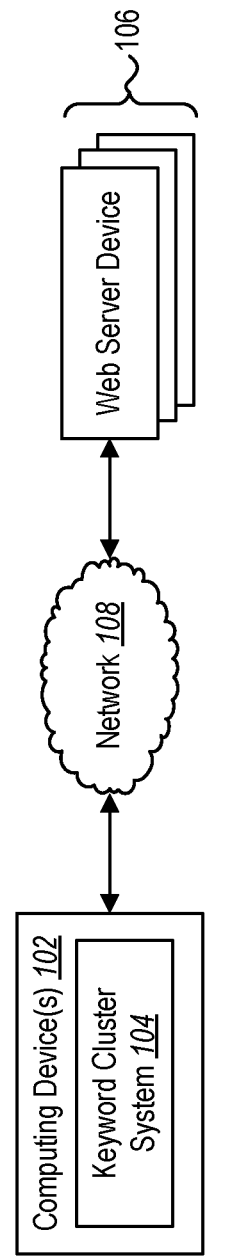
FIG. 1 illustrates an example environment of a keyword cluster system in accordance with one or more embodiments.

The present disclosure relates generally to a keyword cluster system that intelligently identifies keywords that are relevant and useful for promoting a profile of a particular domain (e.g., a target domain). In particular, as will be described in further detail below, the keyword cluster system can determine value metrics for any number of keywords to identify one or more candidate keywords (e.g., primary keywords, secondary keywords) associated with a set of value metrics that indicate a likelihood that promoting the candidate keyword(s) would yield positive results. For example, and as will be discussed further, the keyword cluster system can identify any number of keyword clusters including candidate keywords and related terms (e.g., terms that frequently appear within similar search queries). The keyword cluster system can additionally implement the keyword clusters within a structure (e.g., code elements) of a published content item, such as an online article, a published infographic, an interactive document, or a webpage.

By way of example, the keyword cluster system can apply a keyword value model to a collection of keywords associated with a target domain for a website (and one or more related and/or competitor domains) to determine a plurality of value metrics for the collection of keywords. In particular, the keyword cluster system may receive, generate, or otherwise obtain value metrics including a volume value, a bid value, a difficulty value, and/or a rank value corresponding to each keyword from the collection of keywords descriptive of characteristics of the keyword in relation to one or more domains related to a specific topic. Based on this information, the keyword cluster system can gather an up-to-date picture of which websites are showing up within a list of search results for certain search terms as well as what websites are promoting which search terms.

Based on the value metrics, the keyword cluster system can identify one or more candidate keywords predicted to be useful for promoting a target domain. For example, the keyword cluster system can identify a candidate keyword (or multiple candidate keywords) having a high volume value, a high bid value, and a low difficulty value. The keyword cluster system may additionally consider one or more candidate keywords based on a current rank of the keyword for the domain. As will be discussed in further detail below, the keyword cluster system can identify candidate keywords based on a determination that each of a set of value metrics exceed a threshold value (e.g., a percentile value).

As will be discussed in further detail below, the keyword cluster system can additionally generate keyword clusters including one or more candidate keywords and associated terms. For example, upon identifying a candidate keyword, the keyword cluster system can identify associated terms that appear with high frequency within the same search queries as the candidate keyword. The keyword cluster system can generate any number of keyword clusters based on a number of identified candidate keywords or some goal associated with boosting a profile of a website.

Upon generating the keyword clusters, the keyword cluster system can implement the keyword clusters in a variety of ways. For example, in one or more embodiments described herein, the keyword cluster system can modify a website or existing online content item (e.g., an online article, a published infographic, an interactive document, or a webpage) by adding the keyword and associated terms to an existing structure of the website or existing online content item. In addition, or as an alternative, the keyword cluster system can create and publish new content items in which the candidate keyword and associated terms are implemented within the structure of the new content item.

As will be discussed in further detail below, the present disclosure includes a number of practical applications having features described herein that provide benefits and/or solve problems associated with generating keyword clusters and implementing keyword clusters within content items in an efficient and effective way. For example, by selectively identifying candidate keywords based on a determination that each value metric from a set of value metrics exceeds a threshold value, the keyword cluster system significantly narrows the focus to a select set of keywords that have a higher value to promote for a given entity. This limited selection and generation of keyword clusters significantly reduces expense of storage, computing, and other processing resources in selecting terms and implementing those terms within content items. In addition, limiting a number of candidate keywords in this way facilitates an effective promotion of a domain using less published content than other conventional techniques. Other benefits will be discussed herein in connection with one or more embodiments.

As illustrated in the foregoing discussion, the present disclosure utilizes a variety of terms to describe features and advantages of the keyword cluster system. Additional detail is now provided regarding the meaning of some of these terms. For instance, as used herein, a "keyword" refers to any term or set of multiple terms associated with a domain. For example, a keyword may refer to any term contained within an HTML document. For instance, a keyword may refer to any terms contained within a header, tag, title, URL, data objects, or any other element within or referenced by the HTML document. Further, a keyword may include terms included within documents that are linked to a domain such as libraries, databases, or other sources of content having associated keywords. In one or more embodiments, a keyword refers to any term for which a domain or related domain ranks for using one or more search engines.

As will be discussed in further detail herein, a keyword may be associated with a set of value metrics. As used herein, a "value metric" refers to a characteristic or value (e.g., a score) corresponding to a keyword. For example, a value metric may indicate a characteristic of a keyword with respect to a domain such as a relevance of the keyword for the domain and other related domains. Examples of value metrics described in connection with one or more embodiments herein include a volume value, a bid value, a difficulty value, and a rank-value. A set of value metrics associated with a keyword may include some or all of these value metrics.

As used herein, a "volume metric" refers to an indication of a quantity or frequency of search queries that use a corresponding keyword. For example, a high volume metric may indicate that a large number or high frequency of search queries include a corresponding keyword. In one or more embodiments described herein, a volume metric refers to an average number of times that a keyword is searched on a given search engine within a given month (e.g., based on a rolling average of 12 months).

As used herein, a "bid value" refers to a suggested bid for a keyword based on a goal-oriented metric associated with the keyword. For example, where a keyword has a high associated cost-per-click (CPC) value for a search engine (e.g., based on research indicating a high conversion rate for search results found based on the keyword), the bid value may have a much higher bid value than a keyword having a low CPC value. In one or more embodiments described herein, a bid value refers to a cost amount to bid on an associated keyword in order for an ad for the domain to appear. In one or more embodiments, a bid value corresponds to an average of what other individuals or entities are bidding on a keyword in order to cause an ad for a corresponding domain to rank within a threshold ranking.

As used herein, a "difficulty value" refers to a metric of difficulty to promote a domain using a corresponding keyword. For example, where a common term has a very high volume that is monopolized largely by a few select entities (e.g., big businesses that dominate results for queries that include the keyword), a difficulty value may be high when compared to a less common term or term that is not being bid on. In one or more embodiments, a difficulty value is determined based on a historical presence of one or more individuals or entities having domains that rank for a corresponding keyword. In one or more implementations described herein, a difficulty value is scored on an exponential scale where the difference between two higher numbers is significantly larger than a comparable difference between two lower numbers.

As used herein, a "rank value" refers to a current ranking of a domain with respect to a given keyword. For example, where a domain has a historical presence and currently ranks for a keyword, the current ranking may indicate a place or position relative to other domains that rank for the keyword. As will be discussed herein, a rank value may indicate a proximity to a top-10 ranking, front page ranking, or other predetermined rank and may be used to determine whether to generate a keyword cluster for a corresponding keyword.

As used herein, a "published content item" or "published content" refers to any online content that is created or modified to promote a domain with respect to one or more keywords. By way of example, a published content item may include a published article, a published infographic, or a published interactive document linked or otherwise associated with a website associated with a domain. In one or more embodiments, a published content item refers to one or more webpages that make up a portion of a website associated with a domain.

As will be discussed in one or more embodiments herein, a published content item may have a structure within which keywords and associated terms are implemented. As used herein, a "structure of a content item" may refer to structural elements of the published content within which keywords and associated terms may be included. For instance, structural elements of a published content item may include a URL, a header, and a sub-header (including sub-headers of sub-headers). Where the published content item refers to a hypertext markup language (HTML) document, structural elements may additionally refer to hierarchical elements including HTML tags (e.g., Title tags, H1 tags, H2 tags, H3 tags, etc.) as well as other code elements that make up the HTML document.

Additional detail will now be provided regarding the keyword cluster system in relation to illustrative figures portraying example implementations. For example, FIG. 1 illustrates an example environment 100 for generating keyword clusters associated with a domain and one or more related domains in addition to implementing the keyword clusters within online published content items hosted by one or more web servers.

As shown in FIG. 1, the environment 100 includes computing device(s) 102 having a keyword cluster system 104 implemented thereon. The keyword cluster system 104 can perform features and functionality described herein in connection with generating keyword clusters and implementing the keyword clusters within published content in accordance with one or more embodiments. As further shown in FIG. 1, the environment 100 includes a plurality of web server devices 106 configured to host websites (e.g., a target website associated with a client and related websites associated with competitors to the client).

While FIG. 1 illustrates an example in which the keyword cluster system 104 is implemented on a computing device 102 such as a client device or administrator device, it will be understood that the keyword cluster system 104 may be implemented on a server device or other computing device capable of providing a service for a client device via an application, web browser, or other implementation. For example, while one or more embodiments described herein involve an administrator or user of the computing device(s) 102 that utilizes the keyword cluster system 104 implemented on the computing device(s) 102 to generate and implement keyword clusters, features and functionality described herein in connection with the keyword cluster system 104 on the computing device(s) 102 may similarly apply to a keyword cluster system 104 implemented on a server device and provided by way of a service (e.g., a cloud-based service). In addition, respective features and functionality described in connection with the keyword cluster system 104 may be implemented on the same computing device 102 or across multiple devices.

The computing device(s) 102 may refer to any computing device associated with a user or administrator for use in generating keyword clusters and implementing the keyword clusters within a published content item. For example, a computing device 102 may refer to a consumer electronic device including, by way of example, mobile devices, desktop computers, or other types of computing devices. As further shown in FIG. 1, the computing device(s) 102 and the web server devices 106 may communicate over a network 108. The network 108 may refer to one or multiple networks that use one or more communication protocols or technologies for transmitting data. For example, the network 108 may include the Internet or another data link that enables transport of electronic data between the computing device(s) 102 and the web server devices 106 (or other devices of the environment 100).

Figure 2:
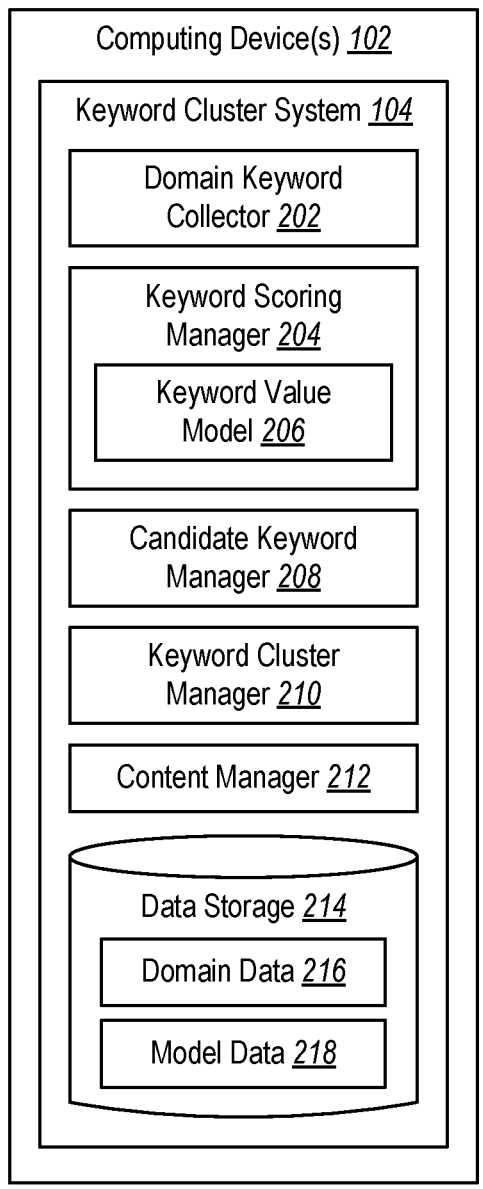
FIG. 2 illustrates an example computing device on which the keyword cluster system is implemented in accordance with one or more embodiments.

As mentioned above, the keyword cluster system 104 includes features and functionality associated with generating keyword clusters for a particular domain and implementing the keyword clusters within a published content item associated with a website corresponding to the domain. For example, FIG. 2 illustrates an example computing device 102 having the keyword cluster system 104 implemented thereon. As shown in FIG. 2, the keyword cluster system 104 includes a domain keyword collector 202 and a keyword scoring manager 204 that utilizes a keyword value model 206. As further shown, the keyword cluster system 104 includes a candidate keyword manager 208, a keyword cluster manager 210, and a content manager 212. The keyword cluster system 104 additionally includes a data storage 214 having domain data 216 and model data 218 stored thereon or otherwise accessible to the computing device(s) 102.

As mentioned above, the keyword cluster system 104 includes a domain keyword collector 202. The domain keyword collector 202 can generate a collection of keywords associated with a domain and one or more related domains. The domain keyword collector 202 may begin by identifying a target domain (e.g., a uniform resource locator (URL)) for a website associated with a client. The domain keyword collector 202 may additionally identify one or more competitor domains (e.g., 3-5 URLs) for websites that are related to or in competition with the target domain. In one or more embodiments, the domain keyword collector 202 additionally identifies URLs of publishers in an associated industry, such as a website or domain for an online magazine or other source of published content.

Upon identifying the target domain and related domains (e.g., competitor domains, publisher URLs), the domain keyword collector 202 can generate a collection of terms for which the target domain and related domains are ranking. For example, the domain keyword collector 202 can identify any number of keywords (e.g., 10,000-100,000 keywords) considered by the target domain and any of the relative domains for which the domains are ranking on one or across multiple search engines.

In one or more embodiments, the domain keyword collector 202 generates the collection of keywords using a crawler or web scraping tool. For example, the domain keyword collector 202 may utilize a crawler tool trained or otherwise configured to systematically browse the Internet and identify any terms by fetching pages (e.g., HTML documents), extracting data and parsing, searching, and reformatting the data to identify a collection of keywords for which the target domain and the related domains are ranking. In one or more embodiments, the domain keyword collector 202 utilizes a crawler tool on the computing device(s) 102. Alternatively, in one or more embodiments, the domain keyword collector 202 utilizes a known third-party software tool provided by or in conjunction with a search engine platform configured to identify a collection of keywords based on an input of one or more given domains (e.g., a target domain and one or more related domains).

Upon generating or otherwise obtaining the collection of keywords, the keyword cluster system 104 can utilize a keyword scoring manager 204 to determine a plurality of value metrics for the keywords from the collection of keywords. For example, the keyword scoring manager 204 can utilize a keyword value model 206 that has been trained or otherwise configured to apply an algorithm to each of the keywords to determine a set of value metrics for each of the keywords. As discussed above, the keyword scoring manager 204 can determine a set of value metrics including a volume value, a bid value, a difficulty value and a current ranking.

As mentioned above, the keyword scoring manager 204 can apply the keyword value model 206 to determine scores associated with each of the value metrics for each keyword from the collection of keywords. For example, the keyword scoring manager 204 can apply the keyword value model 206 to determine a numerical score of each of the keywords from the collection of keywords for each value metric. For instance, the keyword scoring manager 204 can apply the keyword value model 206 including an algorithm or model for each of the value metrics to determine a volume value, a bid value, a difficulty value, and a current ranking for each of the keywords from the collection of keywords.

In one or more embodiments, the keyword scoring manager 204 determines percentiles for each keyword relative to other keywords within the collection of keywords. For example, the keyword scoring manager 204 can determine a volume percentile indicating a rank of a keyword relative to each of the keywords from the collection of keywords or all terms generally known to the search engine. As another example, the keyword scoring manager 204 can determine a rank or percentile for each of the bid value and difficulty value for the corresponding keyword. With respect to the current ranking, rather than determining a rank or percentile relative to other keywords, the keyword scoring manager 204 can determine a current rank of the domain for the keyword relative to any and all other domains that rank for the keyword.

Upon determining a set of value metrics (e.g., sets of two or more value metrics) for each of the keywords, the candidate keyword manager 208 can identify one or more candidate keywords based on the sets of value metrics corresponding to the collection of keywords. For example, the candidate keyword manager 208 can identify a set of the highest scored keywords based on metric values of the corresponding metrics. For instance, the candidate keyword manager 208 can determine candidate keywords based on a composite or average of value metrics of the corresponding sets of value metrics for the keywords. As an example, the candidate keyword manager 208 may identify a candidate keyword having the highest average, sum, or other composite value of value metrics across the sets of value metrics.

In one or more embodiments, the candidate keyword manager 208 identifies each of the keywords for which each of the value metrics are above a threshold value. For example, the candidate keyword manager 208 can identify a candidate keyword based on a determination that the volume value is above a first threshold value, the bid value is above a second threshold value (e.g., same or different threshold), and the difficulty value is above a third threshold value (e.g., same or different threshold). More specifically, the candidate keyword manager 208 may determine that the volume value is higher than a threshold percentile relative to volume values for other keywords. The candidate keyword manager 208 may additionally determine that the bid value is higher than a threshold percentile (same or different percentile) relative to bid values for other keywords. In addition, the candidate keyword manager 208 can determine that the difficulty value is below a threshold percentile relative to difficulty values for other keywords.

In addition to identifying and comparing the volume value, bid value, and difficulty value to threshold values to determine a relative value of the value metric relative to other keywords, the candidate keyword manager 208 can additionally consider a current rank of a keyword for a search engine in identifying a candidate keyword. For example, where a keyword is near a significant ranking threshold (e.g., ranked 11 and just outside the top 10) for a domain, the candidate keyword manager 208 may determine that promoting the domain for the keyword (e.g., bidding on the keyword) is more valuable than promoting the domain for another keyword nowhere near the significant ranking threshold (e.g., ranked 200 and way outside the top 10) where the two keywords have otherwise similar difficulty, bid, and volume values.

Accordingly, in one or more embodiments, the candidate keyword manager 208 can identify a set of keywords for which each value metric exceeds a threshold value (e.g., where the volume value and bid value are higher than a threshold number and the difficulty value is less than a threshold number). In one or more embodiments, the candidate keyword manager 208 only labels or otherwise identifies those keywords as candidate keywords (e.g., primary keywords) where each of the volume, bid, and difficulty values exceed a threshold value.

In one or more embodiments, the candidate keyword manager 208 may modify criteria for determining a candidate keyword. For example, where a smaller than expected number of the keywords have corresponding value metrics that each exceed a threshold value (or where a user wants to create additional keyword clusters), the candidate keyword manager 208 may discount one of the value metrics to determine an expanded set of candidate keywords. The candidate keyword manager 208 can discount one of the value metrics based on a user input or based on other criteria known by the keyword cluster system 104 about the target domain or client associated with the target domain.

For instance, where generating the candidate keywords based on a requirement that all three of the volume value, bid value, and difficulty value are higher than a threshold value yields less than a threshold number of keywords, the candidate keyword manager 208 can discount one of the three types of values to generate a modified set of candidate keywords including additional keywords for which only two of the three value metrics exceed a threshold value (e.g., secondary keywords). The resulting set of keywords may include any keywords for which any two value metrics of the volume value, bid value, and difficulty value exceed a threshold value. Alternatively, the resulting set of keywords may include any keyword for which two specific value metrics (e.g., two selected metrics or two non-discounted metric) exceed the threshold value.

As an illustrative example, where a small business associated with a domain knows beforehand that their domain will not attract a significant volume of search engine traffic, a user of the computing device 102 may choose to discount the volume value metric. As a result, the candidate keyword manager 208 may ignore any keyword scores associated with volume and only identify those keywords for which bid value and difficulty value exceed a threshold value (e.g., where bid value is in the top-30 percentile and difficulty value is in the bottom-30 percentile relative to other keywords from the collection of keywords).

As another illustrative example, where a large business associated with a domain is likely to draw a large volume of internet traffic or for which the domain already ranks very high, difficulty of ranking for a particular keyword may be less of a concern. As a result, a user of the computing device may choose to discount the difficulty value metric. As a result, the candidate keyword manager 208 may ignore any keyword scores associated with difficulty and only identify those keywords for which bid value and volume value exceed a threshold value (e.g., where both bid value and volume value are in the top-30 percentile relative to other keywords from the collection of keywords).

After identifying one or more candidate keywords including primary keywords (e.g., keywords for which all three of the volume value, bid value, and difficulty value exceed the threshold value) and/or secondary keywords (e.g., keywords for which two of the three of the volume value, bid value, and difficulty value exceed the threshold value), the keyword cluster manager 210 may generate one or more keyword clusters for any number of the candidate keywords. In particular, the keyword cluster manager 210 can generate keyword clusters including candidate keywords and a number of terms associated with the candidate keywords.

The keyword cluster manager 210 can generate keyword clusters in a number of ways. For example, the keyword cluster manager 210 can identify terms that are frequently included within common search queries as the candidate keywords. In one or more embodiments, the keyword cluster manager 210 identifies a collection of search queries and determines metrics of correlation between a candidate keyword and other terms within the queries. Based on the metrics of correlation, the keyword cluster manager 210 can determine a number (e.g., a predetermined number or range) of terms that are frequently found in the same search queries as the candidate keyword. The keyword cluster manager 210 can perform a similar analysis for each of the candidate keywords.

Identifying the terms to include within the keyword clusters may be independent from the collection of keywords and/or the value metrics for the keywords. In particular, in one or more embodiments, the terms associated with the candidate keywords include only terms that are not included within the collection of keywords. In one or more embodiments, the terms associated with the candidate keywords includes a combination of terms included within the collection of keywords (e.g., based on determined correlations within search queries and independent from the associated value metrics) and other terms not found within the collection of keywords.

The keyword cluster manager 210 may additionally implement a number of settings or parameters when generating the keyword clusters. For example, the keyword cluster manager 210 may receive an input of a number of terms to include within each keyword cluster or a number of keyword clusters to generate from the candidate keywords. For instance, the keyword cluster manager 210 may generate keyword clusters having one or multiple candidate keywords and 20-30 associated terms (or other predetermined number or range of numbers). The keyword cluster manager 210 may further generate a number of keyword clusters based on a number of candidate keyword and/or a setting indicating a number of keyword clusters that a user wants to implement.

Upon generating the keyword clusters, the content manager 212 may implement the keyword clusters in a number of ways. In one or more embodiments, the content manager 212 implements the keyword clusters by adding the candidate keywords and associated terms within published content items that link or are otherwise associated with the target domain. For example, in one or more embodiments, the content manager 212 enables a user to add candidate keywords and associated terms to the structure of a published content item.

Adding candidate keywords and terms to a structure of a published content item can be done in a number of ways. For example, in one or more embodiments, the content manager 212 facilitates creating a new content item (e.g., a new HTML document, article, interactive graphic, data object, or other publishable content item) and add the candidate keyword and associated terms to code elements of the content item. For instance, the content manager 212 can add the keyword to a URL, a title, a header (e.g., H1 header, H2 header, H3, header), one or more sub-headers, or other structural element of the content item. As used herein, a structure of a content item may include a header, which may refer to a URL, title, or high-level header of a document. A structure of the content item may additionally include a body, which may refer to lower level headers, sub-headers, text paragraphs, or other portions of the published content item.

In addition to creating new content, the content manager 212 can additionally modify existing content items to include the candidate keyword and associated terms. For example, the content manager 212 can modify a website of the target domain or related domain (e.g., a domain or individual webpage that already links the target domain) to similarly include the candidate keyword(s) and associated terms. For example, the content manager 212 can add the candidate keyword to a header (e.g., the URL, title, header(s)) of the content item and/or the body of the content item.

In one or more embodiments, the content manager 212 adds keywords and associated terms in a hierarchical manner. For example, in one or more embodiments, the content manager 212 adds a candidate keyword to a URL or title of a content item and then adds associated terms from the keyword cluster to lower level elements of the content item. For instance, the content manager 212 may add terms to sub-headers, paragraphs, or other elements of a body of the content item in a hierarchical way putting a larger emphasis on the candidate keyword than the associated terms while still incorporating each of the keywords and terms within the content item.

As mentioned above, and as further shown in FIG. 2, the keyword cluster system 104 includes a data storage 214 having domain data 216 stored thereon. The domain data 216 may be stored on or otherwise accessible to the computing device 102. In addition, the domain data 216 may be used by any of the components described above to perform various features and functionality described herein. The domain data 216 may include any data associated with a target domain or website for which the candidate keywords are being determined and for which keyword clusters are generated. For example, the domain data 216 may include a URL of the domain as well as any terms for which the target domain is ranking on one or more search engines. The domain data 216 may further include search data, which may include data about search results and/or search queries that involve any number of keywords or terms.

In addition to information about a specific target domain, the domain data 216 may additionally include information about related domains. For example, the domain data 216 may include any information about competitor domains such as an identifier of the competitor domain (e.g., a URL or title), content from a website of the domain, and search data such as keywords and search queries associated with the competitor domains. The domain data 216 may additionally include identifiers of published content items (e.g., online articles and other content items) related to or linked to the target domain and/or competitor domains. The domain data 216 may additionally include keywords and terms associated with the published content items.

As further shown, the data storage 214 may include model data 218. Similar to the domain data 216, the model data 218 may be stored on or otherwise accessible to the computing device 102. The model data 218 may additionally be used by any of the components described above to perform various features and functionality described herein. The model data 218 may include any information about the model and/or algorithms used by the keyword cluster system 104 to generate a collection of keywords as well as selectively identify candidate keywords from the collection of keywords. The model data 218 may refer to one or more algorithms. In one or more embodiments, the model data 218 includes one or more machine learning models or other deep learning models trained to identify keywords, generate value metrics for the keywords, selectively identify candidate keywords, and/or generate keyword clusters in a variety of ways.

In one or more embodiments, each of the components 202-214 of the keyword cluster system 104 are in communication with one another using any suitable communication technologies. Additionally, the components 202-214 of the keyword cluster system 104 may be in communication with one or more other devices. It will be recognized that although the components 202-214 of the keyword cluster system 104 shown in FIG. 2 are shown to be separate subcomponents of the keyword cluster system 104, any of the components or subcomponents may be combined into fewer components, such as into a single component, or divided into more components as may serve a particular embodiment. Moreover, one or more of the individual components 202-214 may be implemented on a different device than the computing device(s) 102 in one or more embodiments described herein.

The components 202-214 of the keyword cluster system 104 can include software, hardware, or both. For example, the components 202-214 of the keyword cluster system 104 can include one or more instructions stored on a computer-readable storage medium and be executable by processors of one or more computing devices. When executed by the one or more processors, the computer-executable instructions of the keyword cluster system 104 can cause the computing device(s) 102 to perform methods and series of acts described herein. Alternatively, components of the keyword cluster system 104 can include hardware, such as a special-purpose processing device to perform a certain function or group of functions. Additionally, or alternatively, the components 202-214 of the keyword cluster system 104 can include a combination of computer-executable instructions and hardware.

Figure 3:
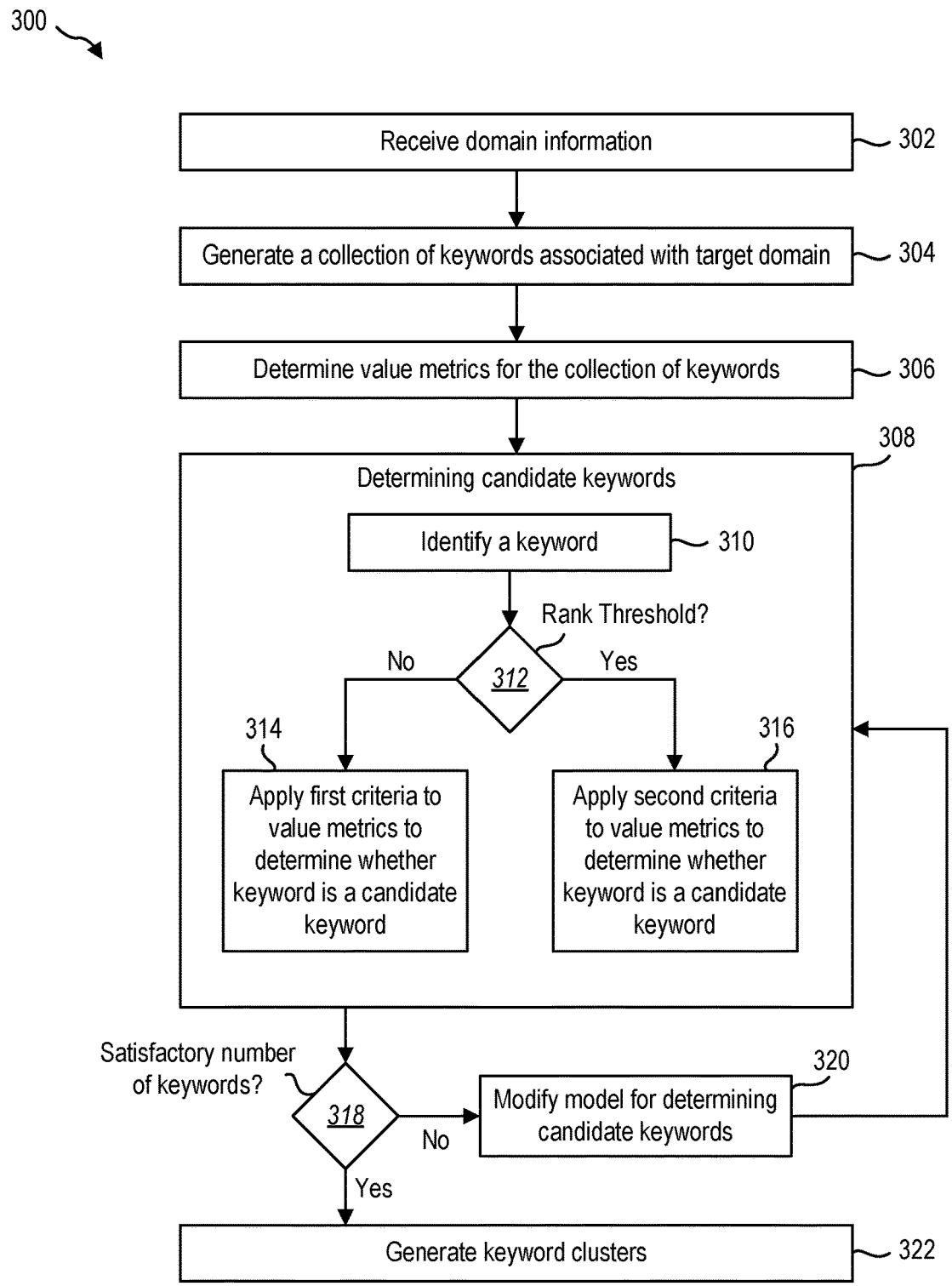
FIG. 3 illustrates an example workflow for generating one or more keyword clusters in accordance with one or more embodiments.

Moving on, FIG. 3 illustrates a workflow 300 showing an example implementation of the keyword cluster system 104 for generating keyword clusters in accordance with one or more embodiments. In particular, the workflow 300 illustrates an example series of acts that may be performed by one or more computing devices having the keyword cluster system 104 implemented thereon. As shown in FIG. 3, the series of acts includes an act 302 of receiving domain information. As mentioned above, the domain information may include any information about a domain for a target website and one or more related domains (e.g., competitor domains, published content).

As further shown, the series of acts includes an act 304 of generating a collection of keywords associated with the target domain. Similar to one or more embodiments described above, the keyword cluster system 104 can implement a crawler tool or other technique to collect any keywords for which the domain and related domains rank on one or more search engines.

As further shown, the series of acts includes an act 306 of determining value metrics for the collection of keywords. In particular, as discussed above, the keyword cluster system 104 can determine sets of value metrics including, by way of example, a volume value, a bid value, and a difficulty value for each keyword from the collection of keywords. In one or more embodiments, the keyword cluster system 104 additionally identifies, receives, or otherwise determines a current rank of the keyword(s) for one or more search engines.

As further shown, the series of acts may include an act 308 of applying a model or algorithm (e.g., a candidate keyword identification model) to determine candidate keywords. In particular, the keyword cluster system 104 can apply a model or algorithm to each keyword from the collection of keywords to determine whether a keyword should be categorized or otherwise labeled as a candidate keyword based on a combination of the value metrics for each of the respective keywords. FIG. 3 illustrates an example implementation that may be applied to each of the keywords. In particular, the keyword cluster system 104 may perform acts 310-316 on each keyword from the collection of keywords to identify a set of candidate keywords.

As shown in FIG. 3, the keyword cluster system 104 can perform an act 310 of identifying a keyword. For example, where the keyword cluster system 104 iteratively goes through and analyzes each keyword, the keyword cluster system 104 may identify a next keyword from the collection of keywords that has yet to be evaluated.

In one or more embodiments, the keyword cluster system 104 may perform an act 312 of determining whether a rank threshold applies. For example, the keyword cluster system 104 may determine if a current ranking for a keyword with regard to the target domain is already ranking at a reasonably high ranking. As another example, the keyword cluster system 104 may determine if a current ranking for the keyword with regard to the target domain is near a significant rank threshold that would enable the keyword cluster system 104 to push a ranking of the domain for the keyword to a more visible level. For instance, where a domain is currently ranking $11^{th}$ or $12^{th}$ for a corresponding keyword and where a search engine platform lists domains ranked 1-10 on a front page of search results, the keyword cluster system 104 may determine that the keyword satisfies a rank threshold. Alternatively, where a domain is currently ranking $200^{th}$ for a corresponding keyword, the keyword cluster system 104 may determine that a greater amount of effort would be needed to boost the domain rank and determine that the keyword does not satisfy the rank threshold.

As shown in FIG. 3, the keyword cluster system 104 may apply different criteria to value metrics associated with the keyword based on whether the keyword satisfies the rank threshold. For example, where the keyword does not satisfy the rank threshold, the keyword cluster system 104 may perform an act 314 of applying a first criteria to value metrics of the keyword to determine whether the keyword is a candidate keyword. The first criteria may be a higher or otherwise more restrictive criteria than other criteria, such as requiring that all three of the volume value, bid value, and the difficulty value exceed a threshold value in order for the keyword to be identified as a candidate keyword.

As further shown, where the keyword does satisfy the rank threshold, the keyword cluster system 104 may perform an act 316 of applying a second criteria to value metrics of the keyword to determine whether the keyword is a candidate keyword. The second criteria may be more flexible or lenient than the first criteria, such as requiring that two of the three value metrics exceed a threshold value in order for the keyword to be identified as a candidate keyword. In one or more embodiments, the criteria may require that any two of the three value metrics exceed the threshold value. Alternatively, the criteria may involve discounting a specific value metric and requiring that each of the non-discounted value metrics exceed the threshold value.

In addition or as an alternative to applying criteria having a different required number of value metrics that exceed a criteria, the different criteria may have different threshold values altogether. For example, the first criteria may require that two or three of the value metrics (e.g., volume value, bid value, difficulty value) exceed a high threshold value (e.g., top-10% volume value, top-10% bid value, bottom 10% difficulty value). In contrast, the second criteria may require that two or three of the value metrics exceed a lower threshold value (e.g., top-30% volume value, top-30% bid value, bottom 30% difficulty value). The criteria may also include different percentiles for the different value metrics.

While FIG. 3 illustrates an example in which two different criteria may be applied based on whether the keyword satisfies a rank threshold, the model may have any number of criteria to apply under different circumstances. For example, the model may implement 3 or 4 or more different rank thresholds and have different criteria to apply to the keyword depending on which of the rank thresholds apply to the current rank of the keyword.

After evaluating the keywords and identifying any number of candidate keywords, the keyword cluster system 104 can perform an act 318 of determining whether a set of candidate keywords includes a satisfactory number of keywords. If the keyword cluster includes less than some predetermined number of keywords or if a user indicates that the keyword cluster does not include enough keywords, the keyword cluster system 104 can perform an act 320 of modifying the model or algorithm for identifying the candidate keywords and returning to perform act 308 again with respect to the collection of keywords. Alternatively, while not shown in FIG. 3, where the set of candidate keywords includes too many keywords (e.g., the set of candidate keywords exceeds a high threshold or a user indicates that the set of candidate keywords should include fewer keywords), the keyword cluster system 104 can similarly modify the model and again perform act 308 with respect to the collection of keywords.

The keyword cluster system 104 may modify the model or algorithm for identifying the candidate keywords in a variety of ways. For example, the keyword cluster system 104 may change one or more of the criteria used for determining whether a keyword is identified as a candidate keyword. As another example, the keyword cluster system 104 can modify the rank threshold to determine whether one or another criteria should be applied to a corresponding keyword.

In one or more embodiments, the keyword cluster system 104 modifies the model based on one or more selected options by a user of the computing device(s) 102. For example, in one or more embodiments, the keyword cluster system 104 provides a graphical user interface including one or more selectable options to enable an individual to modify the model or algorithms in one or more ways. This may include selecting or deselecting value metrics or fine-tuning criteria to be applied to the different keywords. An example of a graphical user interface that illustrates sample features and functionality of the keyword cluster system 104 is discussed in further detail below in connection with FIG. 5.

As shown in FIG. 3, where the keyword cluster system 104 determines that a set of candidate keywords includes a satisfactory number of keyword, the keyword cluster system 104 can perform an act 322 of generating keyword clusters. As discussed above, the keyword cluster system 104 can identify any number of terms associated with one or more keywords based on a frequency that the terms are included within common search queries as the corresponding candidate keywords. Also discussed above, the keyword clusters may include one or multiple candidate keywords and any number (e.g., a predetermined number) of associated terms.

Figure 4:
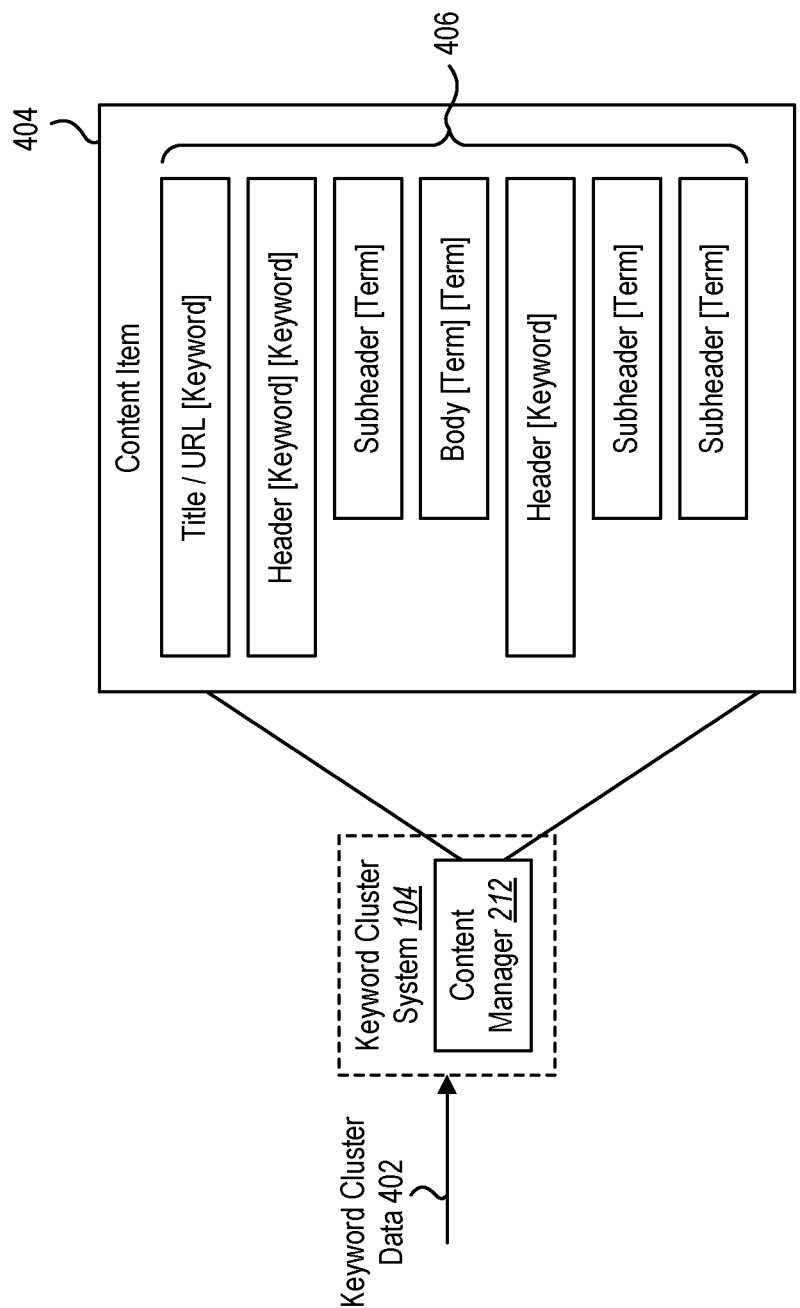
FIG. 4 illustrates an example workflow for implementing one or more keyword clusters within a published content item in accordance with one or more embodiments.

Moving on, FIG. 4 shows an example in which the keyword cluster system 104 implements a keyword cluster within a published content item. In particular, the keyword cluster system 104 (or content manager 212 on the keyword cluster system 104) may receive keyword cluster data 402 and implement the candidate keyword(s) and associated terms from the keyword cluster data 402 within a structure of a content item. In one or more embodiments, an administrator or user of the computing device 102 creates a content item 404 (or modifies an existing content item) and adds the candidate keyword and associated terms to the structure of the content item 404.

FIG. 4 shows an example content item 404 including structural elements 406 within which the keyword cluster system 104 may be used to add candidate keywords and associated terms to the content item 404. As shown in FIG. 4, the keyword cluster system 104 may be used to add a candidate keyword (or multiple keywords) to a title or URL of the content item 404. As further shown, candidate keywords and/or terms may be added to headers, sub-headers, and body elements (e.g., paragraphs, image, etc.). In one or more embodiments, the keyword cluster system 104 adds the candidate keywords and associated terms in a hierarchical way. For example, the candidate keyword(s) may be added to higher level elements (e.g., title, URL, headers) while the associated terms are added to lower level elements (e.g., sub-headers, lower level headers, body elements) of the content item 404.

Figure 5:
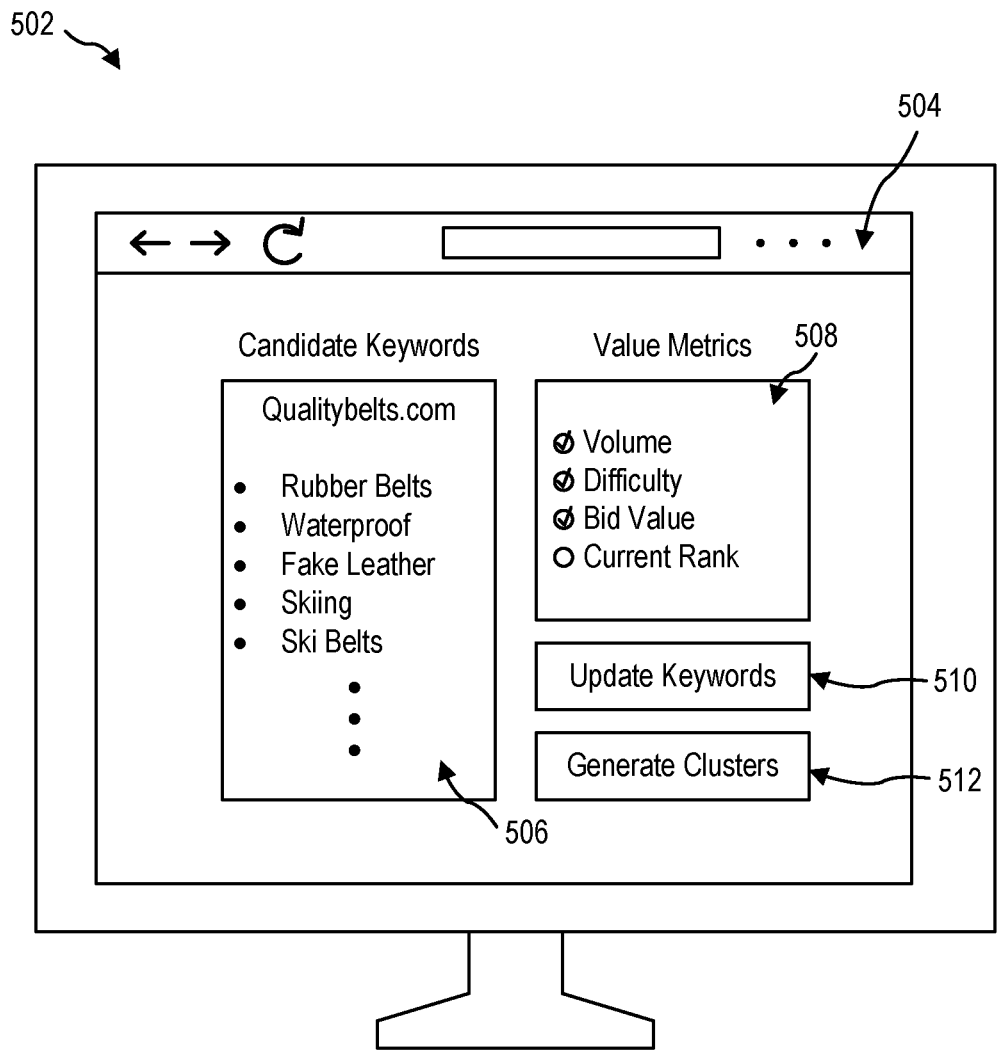
FIG. 5 illustrates an example graphical user interface for modifying selection of candidate keywords and generating keyword clusters in accordance with one or more embodiments.

As mentioned above, in one or more embodiments, a user or individual associated with the computing device 102 may modify one or more features of the analysis of the keywords in order to selectively identify those candidate keyword that are most valuable to promote for a particular domain. FIG. 5 shows an example implementation in which the keyword cluster system 104 provides a number of selectable elements that enable a user of a computing device to interact with a graphical user interface and modify one or more parameters of the keyword cluster system 104 used for determining candidate keywords and generate keyword clusters.

For example, FIG. 5 illustrates an example computing device 502 having similar features and functionality as the computing device(s) 102 discussed above in connection with FIGS. 1-4. The computing device 502 may have the keyword cluster system 104 implemented thereon or may access features and functionality of the keyword cluster system 104 via a web browser or other local application on the computing device 502. As shown in FIG. 5, the computing device 502 provides a display of a graphical user interface 504 including a number of selectable elements with which a user of the computing device 502 may interact.

As shown in FIG. 5, the graphical user interface 504 includes an example web browser interface including a listing of candidate keywords 506 determined for a domain of "qualitybelts.com," which, for the purpose of explanation, is an identifier of a domain for a company that sells belts from rubber materials. As shown in FIG. 5, the listing of candidate keywords 506 may include a listing of keywords that the keyword cluster system 104 has determined to have corresponding value metrics that exceed a threshold value.

By way of example, the listing of candidate keywords 506 includes keywords such as "rubber belts," "waterproof," "fake leather," "skiing," and "ski belts." While some of these keywords may be intuitive based on volume or bid value (e.g., rubber belts), other keyword may be less intuitive as a result of a low difficulty value or an unexpectedly high ranking for the domain (e.g., skiing, ski belts). As a result, the keyword cluster system 104 may identify many valuable candidate keywords that have low difficulty, high volume, and/or high bid values that may have a significant impact on the profile of the target domain as well as the rate of conversion for people who visit the website of the domain.

As shown in FIG. 5, the candidate keywords may represent an identification of keywords from a collection of keywords based on a determination that a set of value metrics from a listing of value metrics 508 including selected value metrics of "volume," "difficulty" and "bid value" exceeding or otherwise satisfying a threshold value (e.g., top-30% volume, top 30% bid value, and bottom 30% difficulty).

As shown in FIG. 5, a user of the computing device 502 may interact with the listing of value metrics 508 to select an additional value metric (e.g., current ranking) or deselect one of the previously selected value metrics. A user may select an update keywords button 510 and cause the keyword cluster system 104 to generate an updated listing of candidate keywords 506 in accordance with a selection or deselection of one or more of the value metrics. As further shown, a user may select a generate clusters button 512 and cause the keyword cluster system 104 to generate keyword clusters for each candidate keyword from the listing of candidate keywords 506 (or from a predetermined number of the highest ranked candidate keywords).

While FIG. 5 illustrates an example graphical user interface 504 including some features and functionality discussed herein, the graphical user interface 504 may include additional selectable options related to other aspects of the keyword cluster system 104. Moreover, the keyword cluster system 104 can provide a series of multiple graphical user interfaces having interactable elements that enable a user to provide a variety of inputs in connection with one or more embodiments described herein.

As an example, in collecting domain information, the keyword cluster system 104 can provide a graphical user interface that enables an individual to enter a target domain (e.g. a client URL) and one or multiple competitor URLs and/or content publisher URLs. Upon obtaining keywords and corresponding value metrics (e.g., metric scores), the keyword cluster system 104 can provide another graphical user interface having a listing (e.g., a sortable listing) or display of the identified candidate keywords and associated value metrics for the respective categories. The keyword cluster system 104 can provide this as a table or ranked list of candidate keywords.

In one or more embodiments, the listing of candidate keywords includes selectable options that enables an individual to select one or more keywords from which to generate keyword clusters. The keyword cluster system 104 may further provide a selectable option to generate keywords clusters for each of the candidate keywords. In response to detecting a selection of the selectable option, the keyword cluster system 104 can generate a listing, spreadsheet, or other data object including the candidate keywords and associated terms to enable an individual or system (e.g., the content manager 212) to implement the candidate keyword(s) and associated terms to published content having links or other elements associated with the target domain.

Figure 6:
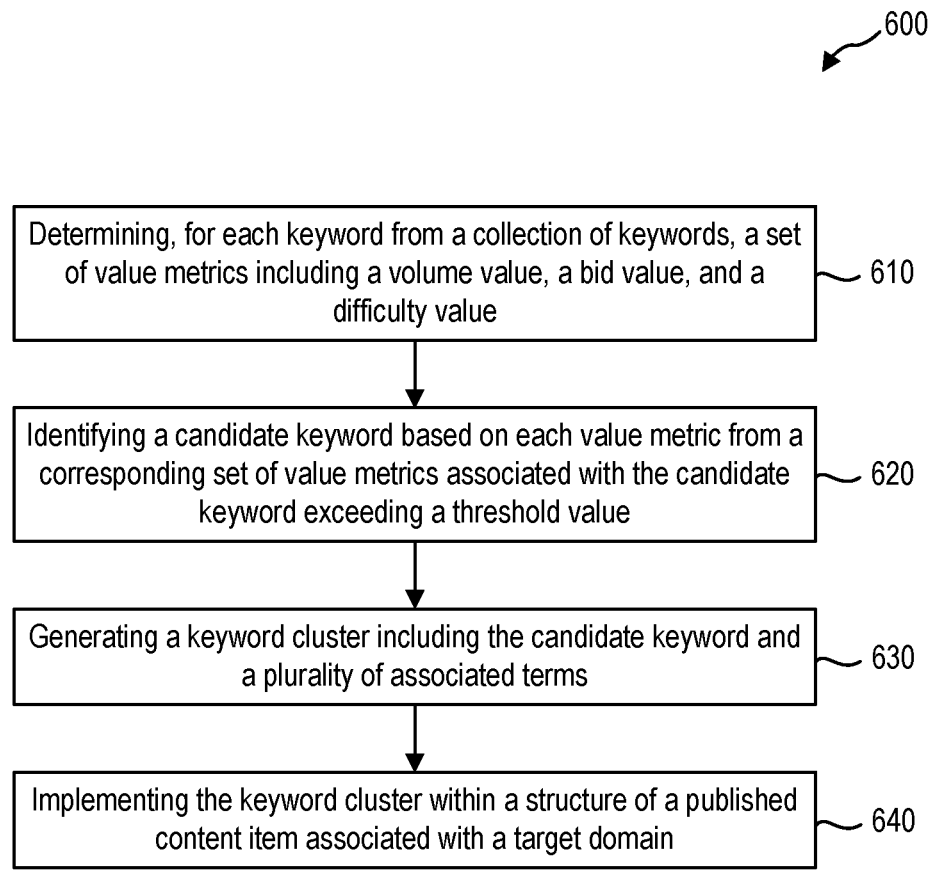
FIG. 6 illustrates an example series of acts for generating and implementing a keyword cluster in accordance with one or more embodiments.

Turning now to FIG. 6, this figure illustrates an example flowchart including a series of acts for generating and implementing keyword clusters in accordance with one or more embodiments described herein. While FIG. 6 illustrates acts according to one or more embodiments, alternative embodiment may omit, add to, reorder, and/or modify any of the acts shown in FIG. 6. The acts of FIG. 6 may be performed as part of a method. Alternative, a non-transitory computer-readable medium can include instructions that, when executed by one or more processors, causes a computing device (or multiple devices) to perform the acts of FIG. 6. In still further embodiments, a system can perform the acts of FIG. 6.

FIG. 6 illustrates a series of acts 600 for generating and implementing keywords clusters for a target domain. As shown in FIG. 6, the series of acts 600 may include an act 610 of determining, for each keyword from a collection of keywords, a set of value metrics including a volume value, a bid value, and a difficulty value. For example, in one or more embodiments, the act 610 may involve applying a keyword value model to a collection of keywords associated with a domain for a website to determine a plurality of value metrics for the collection of keywords where the keyword value model is trained to output, for each keyword from the collection of keywords, a set of value metrics including a volume value, a bid value, and a difficulty value.

In one or more embodiments, the series of acts includes identifying the collection of keywords by identifying a first plurality of terms on a search engine for which the domain of the website is ranking and identifying a second plurality of terms on the search engine for which one or more additional domains related to the domain of the website are ranking. In addition, applying the keyword value model to the collection of keywords may include applying the keyword value model to each term from the first plurality of terms and the second plurality of terms to determine the set of value metrics for each term from the first plurality of terms and the second plurality of terms.

As further shown, the series of acts 600 may include an act 620 of identifying a candidate keyword based on each value metric from a corresponding set of value metrics associated with the candidate keyword exceeding a threshold value. For example, in one or more embodiments, the act 620 involves identifying a candidate keyword based on two or more value metrics from the set of value metrics associated with the candidate keyword exceeding a threshold value.

In one or more embodiments, identifying the candidate keyword includes identifying a subset of keywords from the collection of keywords for which each of the volume value, the bid value, and the difficult value are above the threshold value. In one or more implementations, identifying the candidate keyword includes identifying a subset of keywords from the collection of keywords for which two or more of the volume value, the bid value, and the difficulty value are above the threshold value.

As further shown, the series of acts 600 may include an act 630 of generating a keyword cluster including the candidate keyword and a plurality of associated terms. For example, in one or more embodiments, the act 630 involves generating a keyword cluster for the candidate keyword where the keyword cluster includes the candidate keyword and a plurality of associated terms.

In one or more embodiments, generating the keyword cluster includes analyzing a plurality of search queries for a search engine and identifying the plurality of associated terms from within the plurality of search queries based on a frequency that the plurality of associated terms share a common search query with the candidate keyword. The plurality of associated terms may include words that are not included within the collection of keywords.

As further shown, the series of acts 600 may include an act 640 of implementing the keyword cluster within a structure of a published content item associated with a target domain. For example, in one or more embodiments, the act 640 may involve implementing the keyword cluster within a structure of a published content item associated with the domain. The published content item may include a hypertext markup language (HTML) document. In addition, implementing the keyword cluster within the structure may include adding the candidate keyword and the plurality of associated terms within code elements of the HTML document.

In one or more embodiments, implementing the keyword cluster within the structure includes adding the candidate keyword to a header of the published content item and adding the plurality of associated terms within a body of content of the published content item. In one or more embodiments, adding the candidate keyword to the header of the content item includes embedding the primary keyword within a uniform resource locator (URL) or a title of the published content item. In addition, adding the plurality of associated terms within the body of content of the published content item includes embedding some or all of the terms from the plurality of associated terms within sub-headers of the published content item.

In one or more embodiments, the published content item includes one or more of a published article, a published infographic, or a published interactive document linked to the domain of the website. In addition, in one or more embodiments, implementing the keyword cluster within the structure includes one or more of generating new content and including the candidate keyword and the plurality of associated terms within the structure of the new content or modifying a structure of the webpage by adding the candidate keyword to a title or header of the webpage and adding terms from the plurality of associated terms to a body of the webpage.

In one or more embodiments, the plurality of value metrics further includes a current ranking within a search engine for each keyword associated with the website where a criteria used for identifying the candidate keyword changes based on whether a current ranking for the candidate keyword is above a threshold ranking on a search engine.

In addition, in one or more embodiments, the series of acts 600 includes providing a graphical user interface including a plurality of selectable options, the plurality of selectable options including an option to remove or add a value metric from the plurality of value metrics. In one or more embodiments, the series of acts 600 includes detecting a selection of a selectable option to add or remove a value metric from the set of value metrics and identifying a new candidate keyword based on the value metric being added or removed from the set of value metrics.

In one or more embodiments, the series of acts 600 includes determining that a number of candidate keywords from the plurality of candidate keywords is less than a threshold number of candidate keywords. Based on the number of candidate keywords being less than the threshold number, the series of acts 600 may include discounting one of the volume value, the bid value, or the difficulty value from each set of value metrics from the plurality of sets of value metrics. In addition, the series of acts 600 may include identifying an expanded set of candidate keywords including the plurality of candidate keywords and one or more additional keywords from the collection of keywords based on two or more value metrics from each set of value metrics associated with the plurality of candidate keywords and the one or more additional keywords being above the threshold value.

Figure 7:
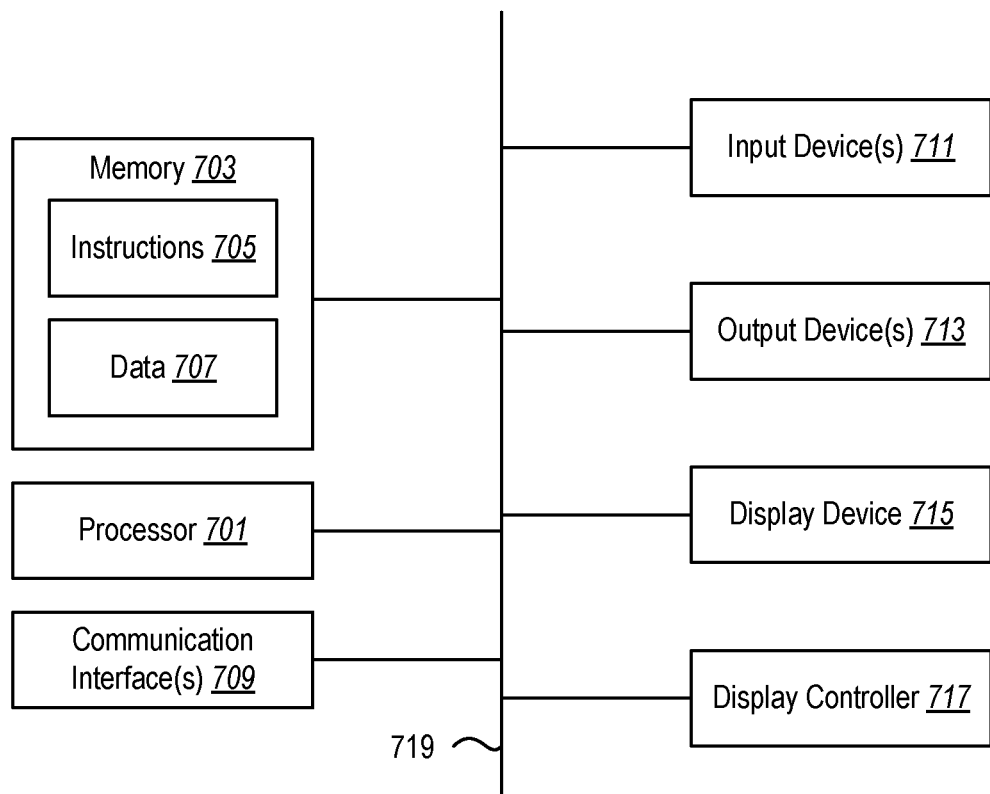
FIG. 7 illustrates certain components that may be included within a computer system.

FIG. 7 illustrates certain components that may be included within a computer system 700. One or more computer systems 700 may be used to implement the various devices, components, and systems described herein.

The computer system 700 includes a processor 701. The processor 701 may be a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 701 may be referred to as a central processing unit (CPU). Although just a single processor 701 is shown in the computer system 700 of FIG. 7, in an alternative configuration, a combination of processors (e.g., an ARM and DSP) could be used.

The computer system 700 also includes memory 703 in electronic communication with the processor 701. The memory 703 may be any electronic component capable of storing electronic information. For example, the memory 703 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 705 and data 707 may be stored in the memory 703. The instructions 705 may be executable by the processor 701 to implement some or all of the functionality disclosed herein. Executing the instructions 705 may involve the use of the data 707 that is stored in the memory 703. Any of the various examples of modules and components described herein may be implemented, partially or wholly, as instructions 705 stored in memory 703 and executed by the processor 701. Any of the various examples of data described herein may be among the data 707 that is stored in memory 703 and used during execution of the instructions 705 by the processor 701.

A computer system 700 may also include one or more communication interfaces 709 for communicating with other electronic devices. The communication interface(s) 709 may be based on wired communication technology, wireless communication technology, or both. Some examples of communication interfaces 709 include a Universal Serial Bus (USB), an Ethernet adapter, a wireless adapter that operates in accordance with an Institute of Electrical and Electronics Engineers (IEEE) 802.11 wireless communication protocol, a Bluetooth wireless communication adapter, and an infrared (IR) communication port.

A computer system 700 may also include one or more input devices 711 and one or more output devices 713. Some examples of input devices 711 include a keyboard, mouse, microphone, remote control device, button, joystick, trackball, touchpad, and lightpen. Some examples of output devices 713 include a speaker and a printer. One specific type of output device that is typically included in a computer system 700 is a display device 715. Display devices 715 used with embodiments disclosed herein may utilize any suitable image projection technology, such as liquid crystal display (LCD), light-emitting diode (LED), gas plasma, electroluminescence, or the like. A display controller 717 may also be provided, for converting data 707 stored in the memory 703 into text, graphics, and/or moving images (as appropriate) shown on the display device 715.

The various components of the computer system 700 may be coupled together by one or more buses, which may include a power bus, a control signal bus, a status signal bus, a data bus, etc. For the sake of clarity, the various buses are illustrated in FIG. 7 as a bus system 719.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method, comprising:
    applying a keyword value model to a collection of keywords associated with a domain for a website to determine a plurality of value metrics for the collection of keywords, the keyword value model being trained to output, for each keyword from the collection of keywords, a set of value metrics including a volume value, a bid value, and a difficulty value;
    identifying a candidate keyword based on two or more value metrics from the set of value metrics associated with the candidate keyword exceeding one or more value metric threshold values;
    generating a keyword cluster for the candidate keyword, the keyword cluster including the candidate keyword and a plurality of associated terms; and
    implementing the keyword cluster within a structure of a published content item associated with the domain by adding one or more portions of the keyword cluster to one or more structural elements within a webpage of the domain.

2. The method of claim 1, wherein identifying the candidate keyword includes identifying a subset of keywords from the collection of keywords for which each of the volume value, the bid value, and the difficulty value are above the one or more value metric threshold values.

3. The method of claim 1, wherein identifying the candidate keyword comprises identifying the candidate keyword from the collection of keywords based on the candidate keyword having the volume value satisfy a volume metric threshold value, the bid value satisfy a bid metric threshold value, and the difficulty value satisfy a difficulty metric threshold value.

4. The method of claim 1, further comprising:
    identifying the collection of keywords by:
        identifying a first plurality of terms on a search engine for which the domain of the website is ranking; and
        identifying a second plurality of terms on the search engine for which one or more additional domains related to the domain of the website are ranking,
    wherein applying the keyword value model to the collection of keywords comprises applying the keyword value model to each term from the first plurality of terms and the second plurality of terms to determine the set of value metrics for each term from the first plurality of terms and the second plurality of terms.

5. The method of claim 1, wherein generating the keyword cluster comprises:
    analyzing a plurality of search queries for a search engine; and
    identifying the plurality of associated terms from within the plurality of search queries based on a frequency that the plurality of associated terms shares a common search query with the candidate keyword.

6. The method of claim 5, wherein the plurality of associated terms includes words that are not included within the collection of keywords.

7. The method of claim 1, wherein the published content item includes a hypertext markup language (HTML) document, and wherein implementing the keyword cluster within the structure comprises adding the candidate keyword and the plurality of associated terms within code elements of the HTML document.

8. The method of claim 1, wherein implementing the keyword cluster within the structure comprises:
    adding the candidate keyword to a header of the published content item; and
    adding the plurality of associated terms within a body of content of the published content item.

9. The method of claim 8, wherein:
    adding the candidate keyword to the header of the published content item comprises embedding a primary keyword within a uniform resource locator (URL) or a title of the published content item; and
    adding the plurality of associated terms within the body of content of the published content item comprises embedding some or all associated terms from the plurality of associated terms within sub-headers of the published content item.

10. The method of claim 1, wherein the published content item includes one or more of a published article, a published infographic, or a published interactive document linked to the domain of the website.

11. The method of claim 1, wherein implementing the keyword cluster within the structure includes one or more of:
generating new content and including the candidate keyword and the plurality of associated terms within the structure of the new content; or
modifying a structure of the webpage by adding the candidate keyword to a title or header of the webpage and adding associated terms from the plurality of associated terms to a body of the webpage.

12. The method of claim 1, wherein the plurality of value metrics further includes a current ranking within a search engine for each keyword associated with the website, and wherein criteria used for identifying the candidate keyword is changes based on whether the current ranking for the candidate keyword is above a threshold ranking on the search engine.

13. The method of claim 1, further comprising providing a graphical user interface including a plurality of selectable options, the plurality of selectable options including an option to remove or add a value metric from the plurality of value metrics.

14. The method of claim 13, further comprising:
detecting a selection of a selectable option to add or remove the value metric from the set of value metrics; and
identifying a new candidate keyword based on the value metric being added or removed from the set of value metrics.

15. A system, comprising:
one or more processors;
memory in communication with the one or more processors; and
instructions stored in the memory, the instructions being executable by the one or more processors to:
apply a keyword value model to a collection of keywords associated with a domain for a website to determine a plurality of value metrics for the collection of keywords, the keyword value model being trained to output, for each keyword from the collection of keywords, a set of value metrics including a volume value, a bid value, and a difficulty value, wherein the difficulty value comprises a metric of difficulty of promoting the domain using a corresponding keyword;
identify a plurality of candidate keywords corresponding to a plurality of sets of value metrics, wherein each of the volume value, the bid value, and the difficulty value from each set of value metrics from the plurality of sets of value metrics exceeds one or more value metric threshold values;
generating a plurality of keyword clusters for the plurality of candidate keywords, each keyword cluster from the plurality of keyword clusters including a candidate keyword and a plurality of associated terms; and
implementing the plurality of keyword clusters within a structure of a published content item associated with the website corresponding to the domain by adding one or more portions of the plurality of keyword clusters to one or more structural elements within a webpage of the domain.

16. The system of claim 15, further comprising instructions being executable by the one or more processors to:
determine that a number of candidate keywords from the plurality of candidate keywords is less than a threshold number of candidate keywords;
based on the number of candidate keywords being less than the threshold number of candidate keywords, discount one of the volume value, the bid value, or the difficulty value from each set of value metrics from the plurality of sets of value metrics; and
identify an expanded set of candidate keywords including the plurality of candidate keywords and one or more additional keywords from the collection of keywords based on two or more value metrics from each set of value metrics associated with the plurality of candidate keywords and the one or more additional keywords being above the one or more value metric threshold values.

17. The system of claim 15, further comprising instructions being executable by the one or more processors to provide a graphical user interface including a plurality of selectable options, the plurality of selectable options including an option to remove or add a value metric from the plurality of value metrics.

18. The system of claim 17, further comprising instructions being executable by the one or more processors to:
detect a selection of a selectable option to add or remove the value metric from each of the plurality of sets of value metrics; and
identify a modified set of candidate keywords based on the plurality of sets of value metrics having the value metric added or removed.

19. A non-transitory computer-readable storage medium storing instructions thereon that, when executed by one or more processors, causes a computing device to:
apply a keyword value model to a collection of keywords associated with a domain for a website to determine a plurality of value metrics for the collection of keywords, the keyword value model being trained to output, for each keyword from the collection of keywords, a set of value metrics including a volume value, a bid value, and a difficulty value;
identify a candidate keyword based on two or more value metrics from the set of value metrics associated with the candidate keyword exceeding one or more metric threshold values;
based on a number of candidate keywords being less than a threshold number, discount one of the volume value, the bid value, or the difficulty value from each set of value metrics from the set of value metrics to expand the number of candidate keywords;
generate a keyword cluster for the candidate keyword, the keyword cluster including the candidate keyword and a plurality of associated terms; and
implement the keyword cluster within a structure of a published content item associated with the website corresponding to the domain by adding one or more portions of the keyword cluster to one or more structural elements within a webpage of the domain.

20. The non-transitory computer-readable storage medium of claim 19, wherein identifying the candidate keyword comprises identifying the candidate keyword from the collection of keywords based on the candidate keyword having the volume value satisfy a volume metric threshold value, the bid value satisfy a bid metric threshold value, and the difficulty value satisfy a difficulty metric threshold value.

* * * * *